(12) United States Patent
Nakada et al.

(10) Patent No.: US 7,376,946 B2
(45) Date of Patent: May 20, 2008

(54) PROGRAM MANAGEMENT METHOD FOR COMPUTER TO WHICH STORAGE MEDIUM IS ATTACHED, COMPUTER AND STORAGE MEDIUM

(75) Inventors: Masahiro Nakada, Kawasaki (JP);
Koichi Ogawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 357 days.

(21) Appl. No.: 10/133,723

(22) Filed: Apr. 26, 2002

(65) Prior Publication Data
US 2002/0129043 A1 Sep. 12, 2002

Related U.S. Application Data

(63) Continuation of application No. PCT/JP99/05944, filed on Oct. 27, 1999.

(51) Int. Cl.
G06F 9/445 (2006.01)
G06F 9/44 (2006.01)

(52) U.S. Cl. ............... 717/174; 717/175; 717/168; 717/169

(58) Field of Classification Search ........... 717/174, 717/175, 168, 169
See application file for complete search history.

(56) References Cited

U.S. PATENT DOCUMENTS

| | | | | |
|---|---|---|---|---|
| 5,287,500 A * | 2/1994 | Stoppani, Jr. | ............... | 711/211 |
| 5,339,400 A * | 8/1994 | Iijima | ............... | 711/115 |
| 5,608,902 A * | 3/1997 | Iijima | ............... | 707/200 |
| 5,649,200 A * | 7/1997 | Leblang et al. | ............... | 717/122 |
| 5,671,420 A * | 9/1997 | Bell et al. | ............... | 717/167 |
| 5,774,713 A * | 6/1998 | Yokota | ............... | 714/25 |
| 5,870,756 A | 2/1999 | Nakata et al. | ............... | 707/200 |
| 6,049,663 A * | 4/2000 | Harikrishnan et al. | ...... | 717/175 |
| 6,074,434 A * | 6/2000 | Cole et al. | ............... | 717/170 |
| 6,178,551 B1 * | 1/2001 | Sana et al. | ............... | 717/174 |
| 6,230,310 B1 * | 5/2001 | Arrouye et al. | ............... | 717/136 |
| 6,775,768 B1 * | 8/2004 | Raspe | ............... | 713/2 |

FOREIGN PATENT DOCUMENTS

| | | |
|---|---|---|
| JP | 3-228136 | 10/1991 |
| JP | 3-256116 | 11/1991 |
| JP | 4-054529 | 2/1992 |
| JP | 8-147278 | 6/1996 |
| JP | 9-185504 | 7/1997 |
| JP | 10-027101 | 1/1998 |
| JP | 10-027426 | 1/1998 |
| JP | 10-069409 | 3/1998 |

\* cited by examiner

*Primary Examiner*—Wei Zhen
*Assistant Examiner*—Qamrun Nahar
(74) *Attorney, Agent, or Firm*—Greer, Burns & Crain, Ltd.

(57) ABSTRACT

A plurality of programs are recorded on a storage medium, selection information for selecting whether or not to permit starting for each program are registered as management information, and, when a program on the storage medium is to be started by a computer, a program only that is permitted for selection is displayed on a display unit with reference to the management information, for selection by a user. A selection-not-permitted sign is set in the portion of the management information involving a program not selected by the user so as to delete a selection-not-permitted program from the storage medium.

4 Claims, 17 Drawing Sheets

PROGRAM MANAGEMENT METHOD FOR COMPUTER TO WHICH STORAGE MEDIUM IS ATTACHED, COMPUTER AND STORAGE MEDIUM

CROSS-REFERENCE TO RELATED APPLICATIONS

This is a continuation of International Application No. PCT/JP99/05944, filed Oct. 27, 1999.

TECHNICAL FIELD

The present invention relates to a computer using a removable storage medium having a rewritable area storing a plurality of programs

BACKGROUND ART

As methods for distributing an application program for use on a computer such as a personal computer, a method using a communications network and a method using a storage medium are generally used. As a method for distributing a relatively large program at once, the latter method, in which the program is sold at a shop in a medium such as a CD-ROM or attached to a magazine, is widely used.

When a user obtained such a CD-ROM on which a program was recorded, the user referenced a piece of software (a menu), or a booklet-type guidebook, which had been prepared with the CD-ROM for making a selection, and the user selected and started a necessary program among a plurality of programs.

At this time, it was possible to duplicate all of the programs from the CD-ROM in a hard disk. However, in order to save a hard disk area, it was effective to start the programs from the CD-ROM. When this kind of operation was performed, since user data generated by the program could not be recorded onto the CD-ROM, it was necessary to register the user data only on the hard disk.

On the other hand, in order to promote software sales, it is conceivable to register a plurality of pieces of software (programs) in advance onto a rewritable medium such as an magnetic optical disk and sell them in this state. When software is unnecessary, the software may be deleted on the user side and the storage medium may be returned to an initial state, and the user may use the storage medium.

However, in the above method of operating the storage medium, in a case where, for example, the user wanted to choose any one of the software programs to try out, the other software programs which were not selected occupied an area on the storage medium. In a case where the user wanted to delete such unselected programs, it was difficult to know which file composed the unselected program, and there was a possibility that the file of the program selected for trial might also be deleted.

Further, there were many cases where data corresponding to such a program was stored in a hard disk drive on the computer side, and management of the program and the data was not easy.

The present invention has been made in light of such points, and has a technical object to raise selective operating effectiveness of the plurality of programs recorded on the storage medium.

BRIEF SUMMARY OF THE INVENTION

In the present invention, a plurality of programs are recorded on a storage medium; selection information for selecting whether or not to permit starting is registered for each program as management information; and in a case where a program on the storage medium is started on a computer, the management information is referenced, only a program which can be selected is displayed on a display device, and a user is permitted to select the program. Then, the management information of the programs which has not been selected by the user is set as selection-not-permitted, and the programs set as selection-not-permitted are deleted from the storage medium.

When the plurality of programs are registered onto the storage medium and distributed to the user in this way, the programs not selected by the user are deleted and therefore a user area on the storage medium can be expanded. Accordingly, for example, it becomes possible to let the user efficiently run any trial program that the user desires without affecting the user area on the storage medium at an initial sale.

DETAILED DESCRIPTION OF THE INVENTION

Hereinafter, the present invention is explained based on the diagrams.

Embodiment 1

Hereinafter, an embodiment of the present invention is explained based on the diagrams.

Figure 1:
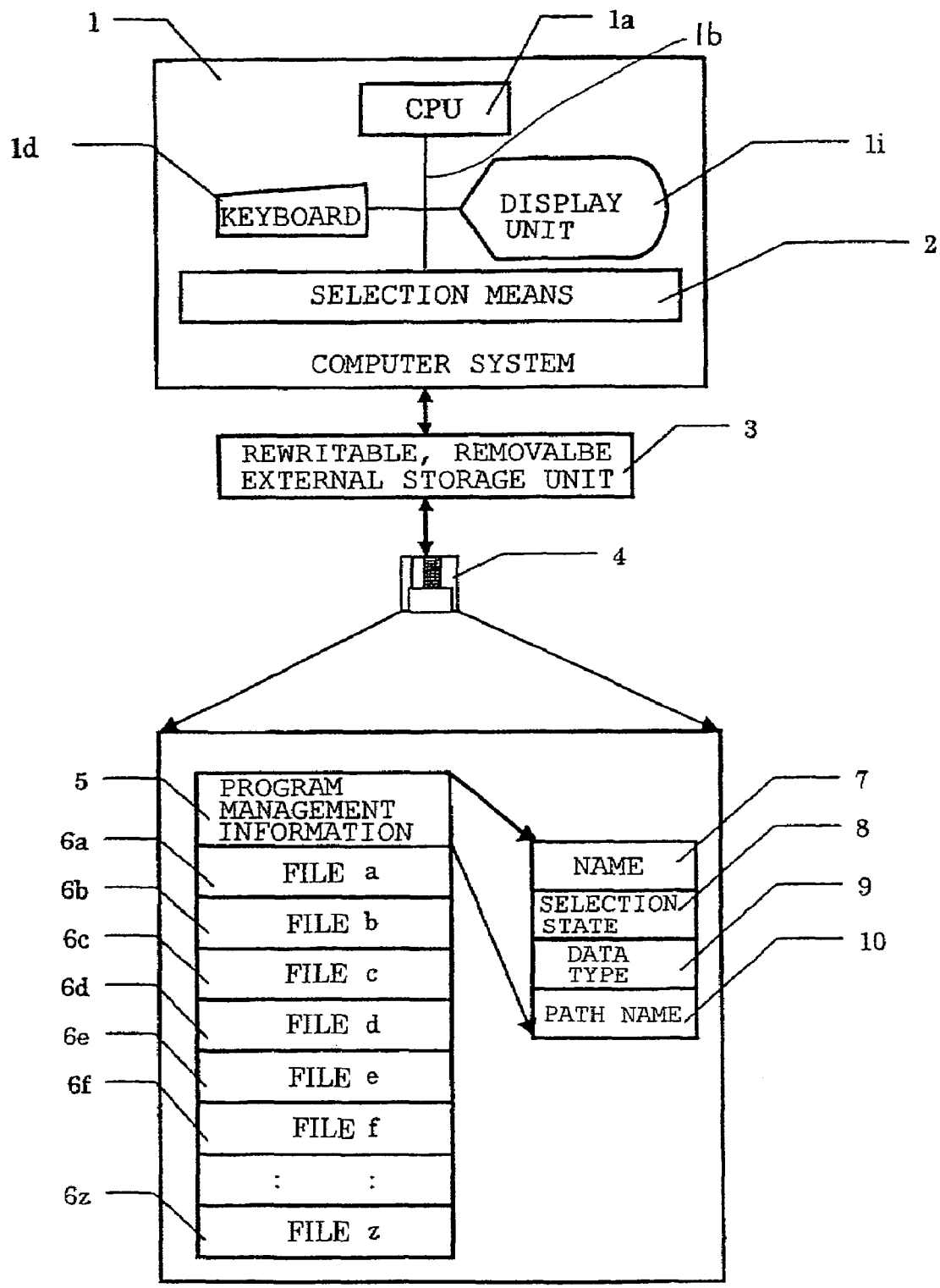
FIG. 1 is a system configuration diagram according to Embodiment 1 of the present invention.

FIG. 1 shows an outline of a system construction in an embodiment of the present invention.

In the same figure, reference numeral 1 designates a computer system realized by a personal computer or the like. This computer system 1 has, around a central processing unit (CPU) 1a, a keyboard 1d and a display device 1i connected by a bus 1b. Further, reference numeral 2 in the same diagram designates a selection means, which is realized by means of a program recorded in the hard disk unit.

This computer system 1 has an external storing unit 3. This external storing unit 3 is a drive device to which a rewritable, removable storage medium 4 may be attached, and is capable of using a magnetic optical disk (MO disk) as a storage medium.

In the storage medium 4, files 6a-6z and program management information 5 are registered. This program management information 5 has respective areas of a name 7, a selection state 8, a data type 9 and a path name 10. Here, the selection state 8 is a flag for indicating whether or not selection is permitted by the selection means 2.

In FIG. 1, a program provider prepares in advance each information for the name 7, the selection information 8, the data type 9 and the path name 10 for each of the programs registered on the storage medium 4, and records these as the program management information 5.

When the storage medium 4 is attached to the external storing unit 3, the selection means 2 references the program management information 5 and determines whether or not selection of the program is permitted. At this time, in a case where the determination is possible, the central processing unit (CPU) 1a displays a selection screen on the display device 1i. The user references this selection screen and selects a desired program by using the keyboard 1d.

At this time, when one program is selected, the selection means 2 rewrites the program management information 5 regarding the unselected programs, and sets the selection information 8 to "selection-not-permitted" state. On the other hand, regarding the program as the object of the selection, according to instructions from the central processing unit (CPU) 1a data for the program is created as a file in the storage medium 4 based on information in the data type 9, and after that, the program is started according to the path name 10.

Figure 2:
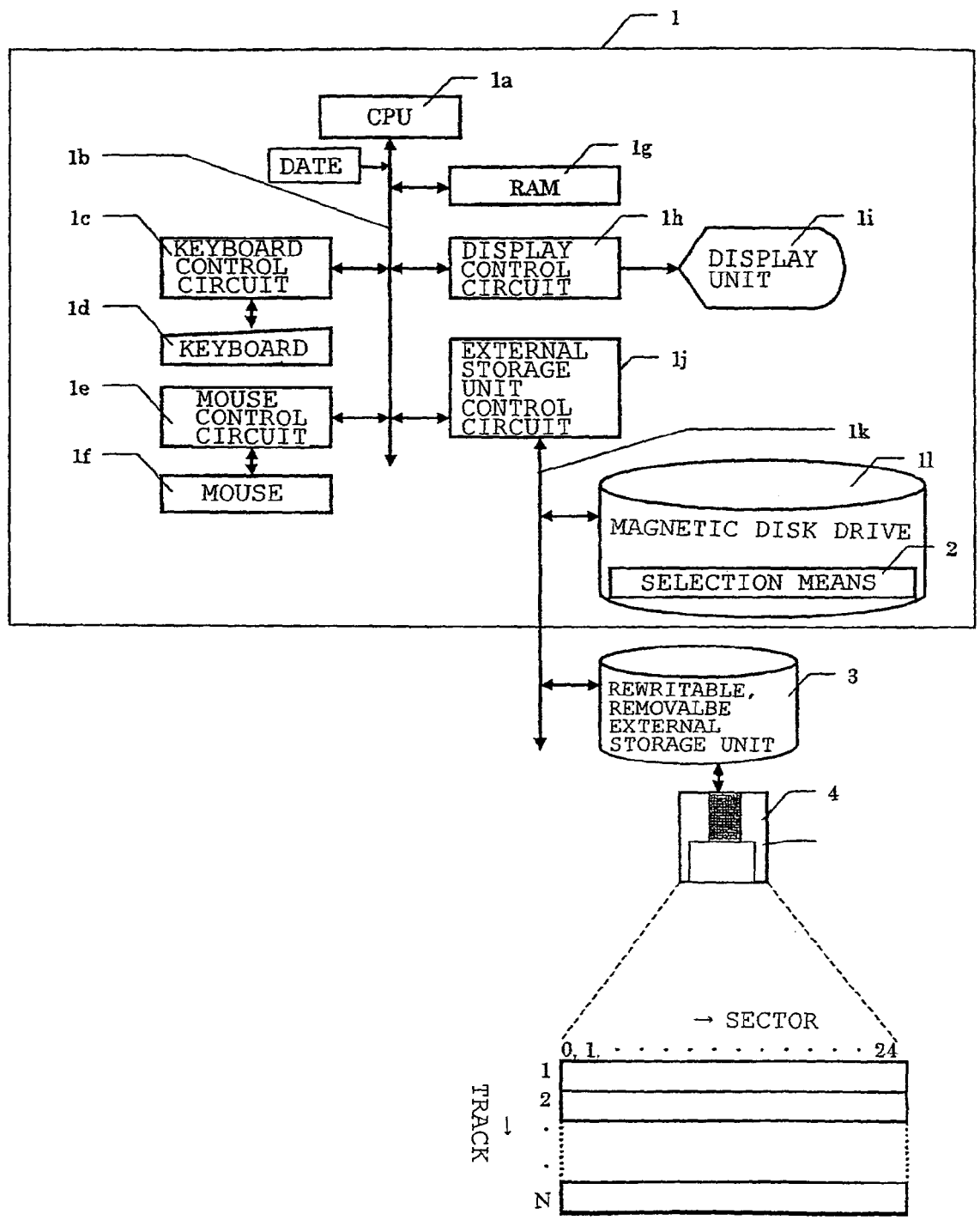
FIG. 2 is a detailed diagram showing the system configuration according to Embodiment 1.

The above is an outline of the present embodiment, but more detailed explanation is made using FIG. 2 and subsequent drawings.

FIG. 2 is a more detailed diagram of the system construction of the present embodiment.

In the same diagram, parts having the same reference numerals as those in FIG. 1 have identical functions, and explanations thereof are omitted. In the same diagram, reference numeral 1c designates a keyboard control circuit. The circuit has a function of detecting interruption by operating the keys of the keyboard 1d and notifying the interruption to the central processing unit (CPU) 1a. Further, there is a mouse 1f as an auxiliary input device and a mouse control circuit 1e for executing control of the mouse.

Reference numeral 1g designates a temporary storing memory (RAM), for temporarily storing data and a program which is to be executed by the central processing unit (CPU) 1a. Reference numeral 1h designates a display control circuit, which executes control of the display device 1i.

Further, an external storing unit control circuit 1j has a function of executing controls of a hard disk unit 11 and the external storing unit 3, which are connected to an external bus 1k.

Note that, in the magnetic optical disk serving as the storage medium 4, data areas are managed according to sectors and tracks as shown in FIG. 2.

Figure 3:
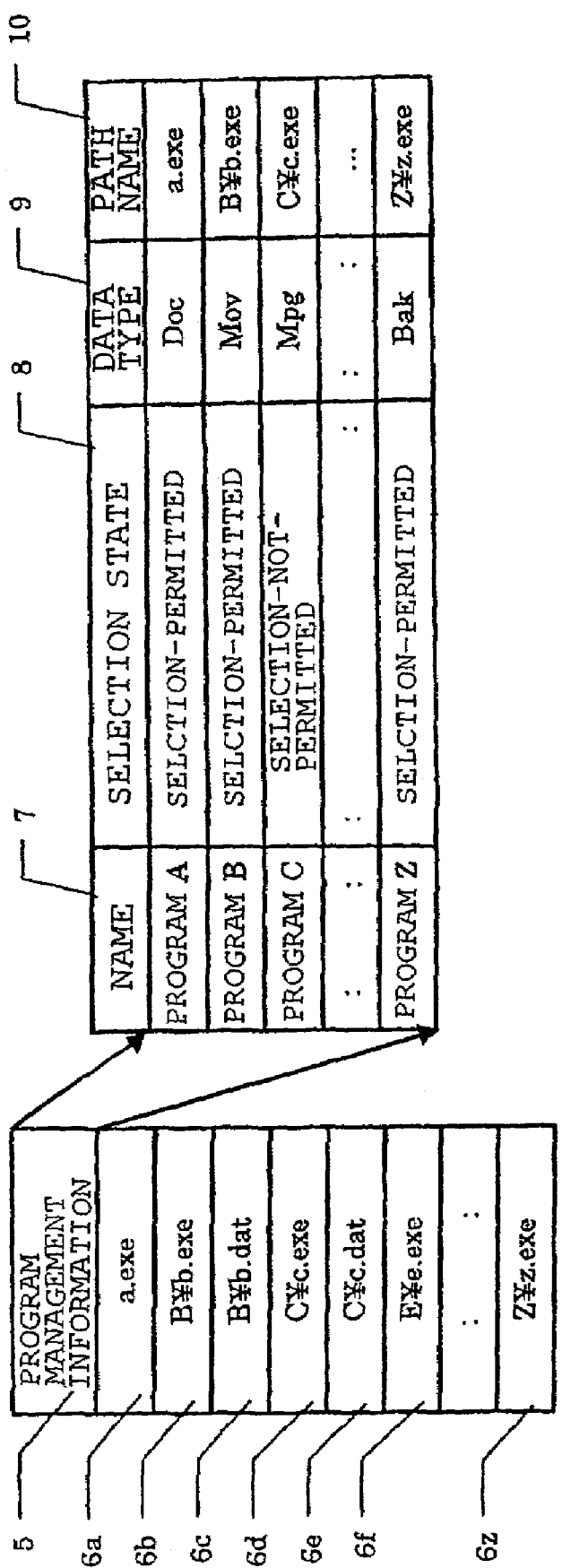
FIG. 3 is a configuration diagram of management information according to Embodiment 1.

FIG. 3 shows details of a data structure in the storage medium 4. File is composed of execution files (a.exe, B¥b.exe, C¥c.exe, E¥z.exe) such as those shown by reference numerals 6a, 6b, 6d, 6f and 6z, and data files (B¥b.dat and C¥c.dat) such as those shown by reference numerals 6c and 6e. One program may be formed by bringing together a plurality of these files. Further, these files may be divided up and stored in a plurality of directories. Further, it is not necessary that all the files in the storage medium 4 be held in the program management information 5 as program execution files. In order to prevent illegitimate copying, these files may be protected by encryption or the like.

As the details of the program management information 5, in the name there is registered the name 7 for specifying a file name or a program. For example, in the case where the program is a program for lumping together the data in the system's hard disk unit 11 and backing it up on the storage medium 4 side, where the file name is "backup.exe", the name 7 is set so as to be "backup", "backup.exe" or "backup software".

The selection state 8 is a flag for indicating whether or not the selection by the selection means 2 is permitted (permitted, not permitted) for each program.

The data type 9 is for indicating the file category, such as an image or a moving image. In the case where Windows by Microsoft is used as an OS (Operating System), extensions may be used such as "Doc" to indicate that the data is document data, "Mov" or "Mpg" to indicate that it is moving image data, or "Bak" to indicate that it is backup data.

The path name 10 is an area for writing the path name of the execution file for the selected program. For example, in the case where "file a" is recorded in a directory (folder) called "abc", the path name is recorded as "abc¥file a".

Figure 4:
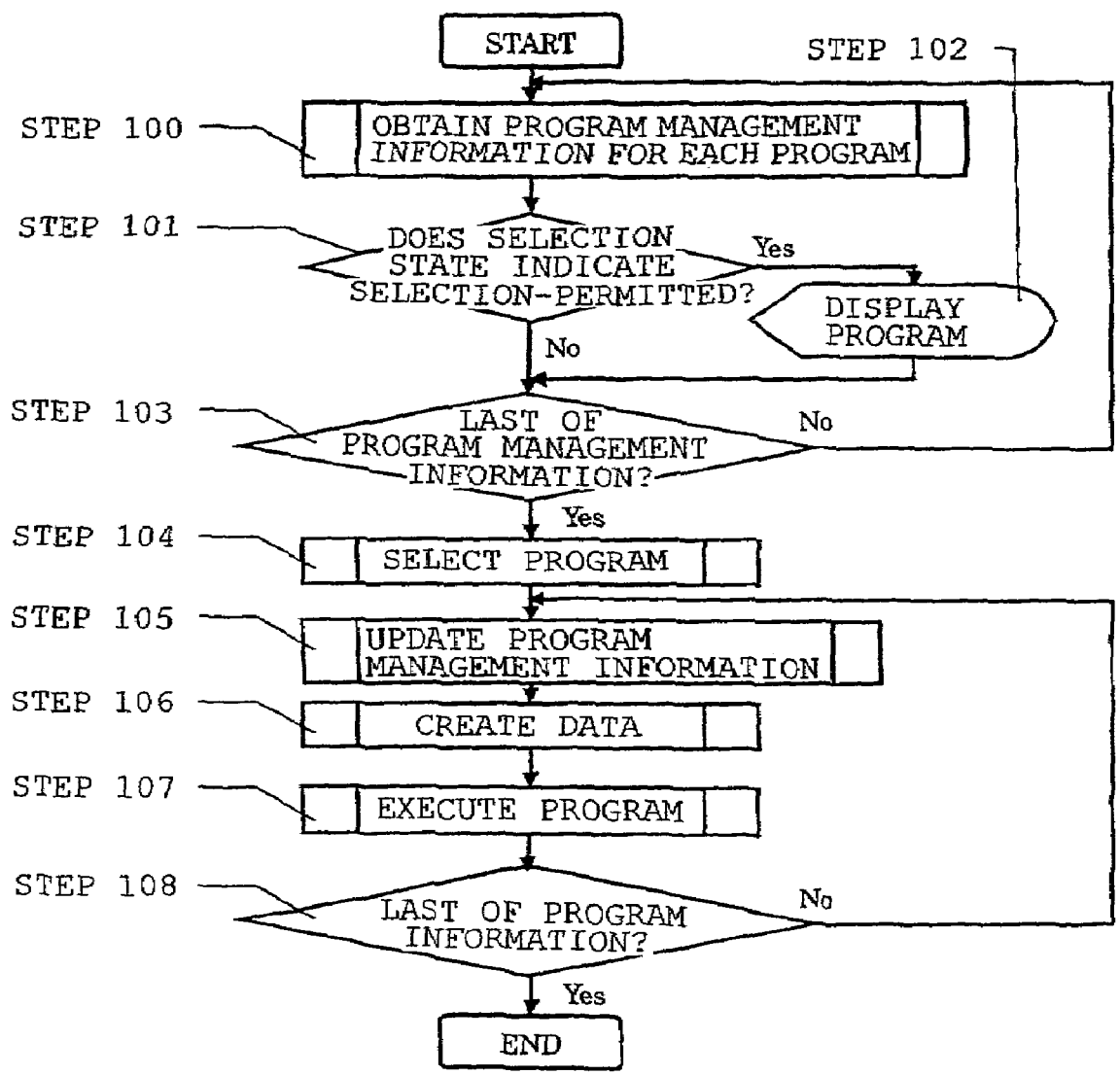
FIG. 4 is a processing flow chart for a selection means according to Embodiment 1.
Figure 5:
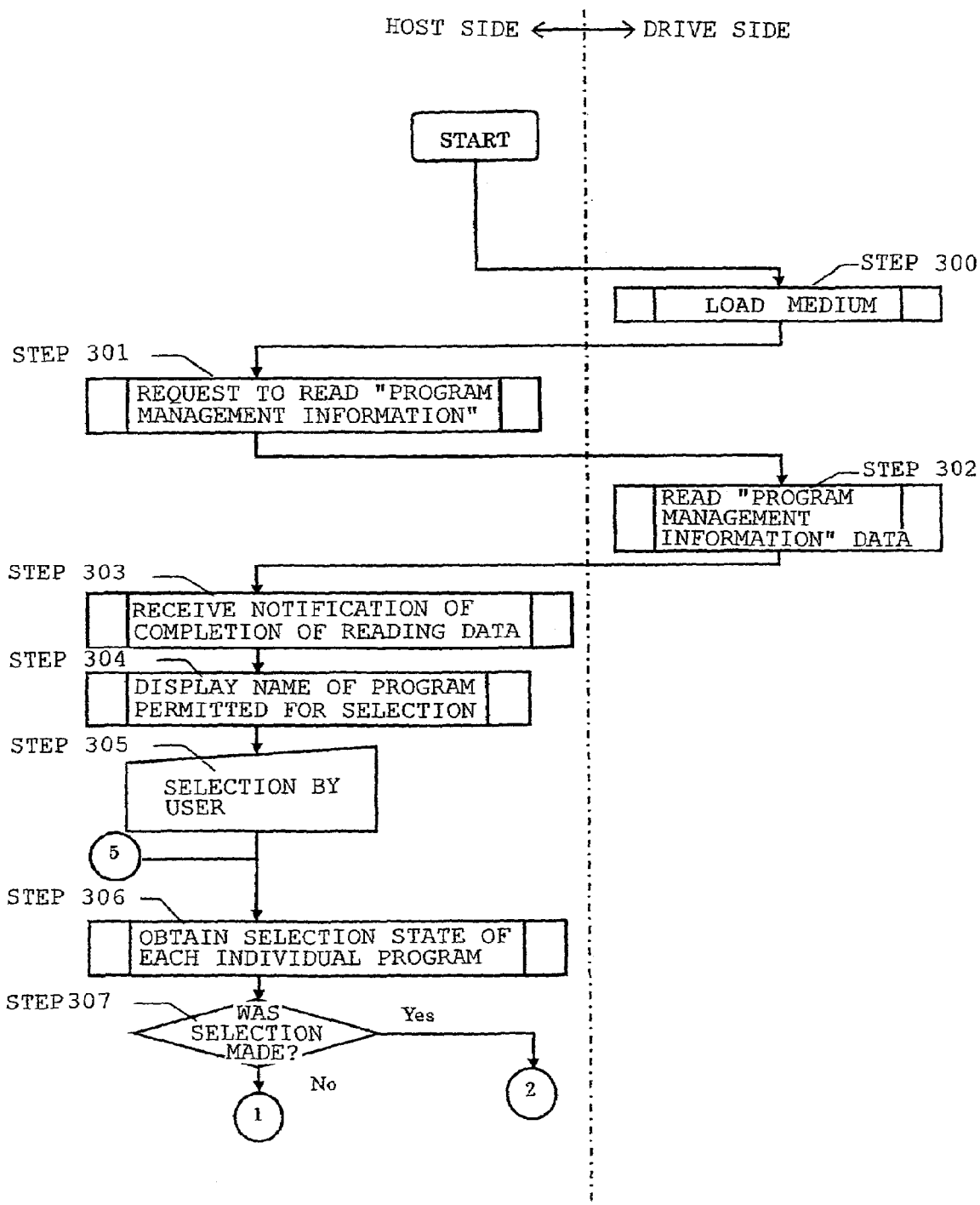
FIG. 5 is a detailed flow chart (1) for the selection means according to Embodiment 1.
Figure 6:
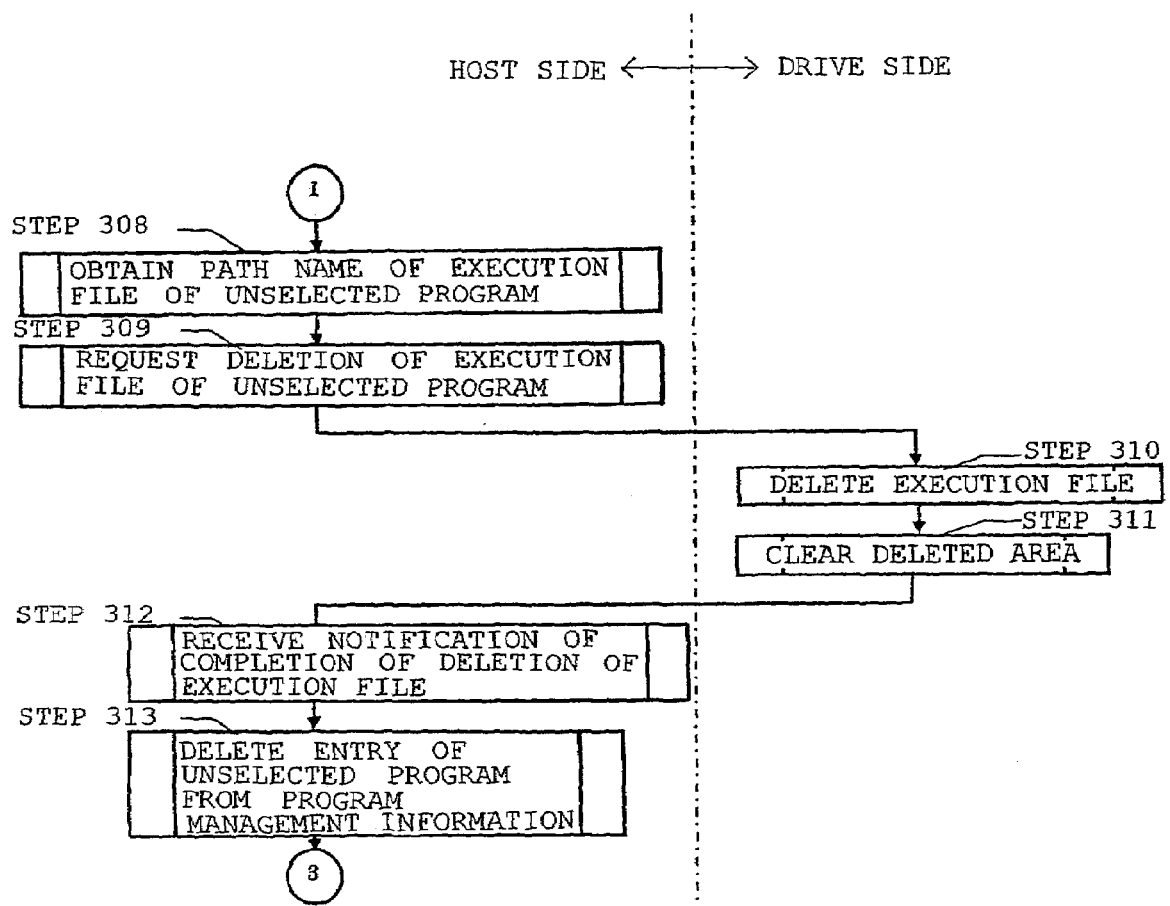
FIG. 6 is a detailed flow chart (2) for the selection means according to Embodiment 1.
Figure 7:
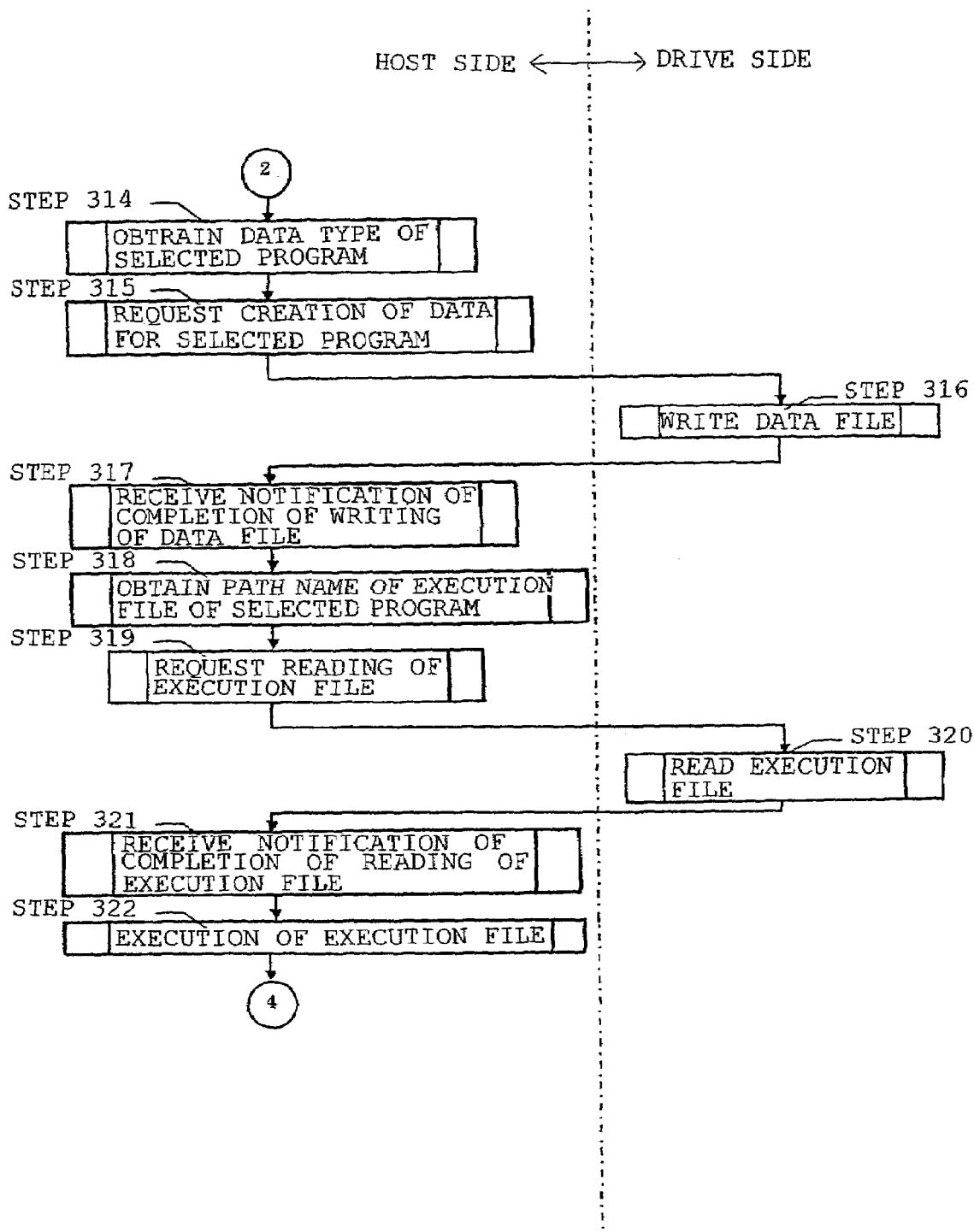
FIG. 7 is a detailed flow chart (3) for the selection means according to Embodiment 1.
Figure 8:
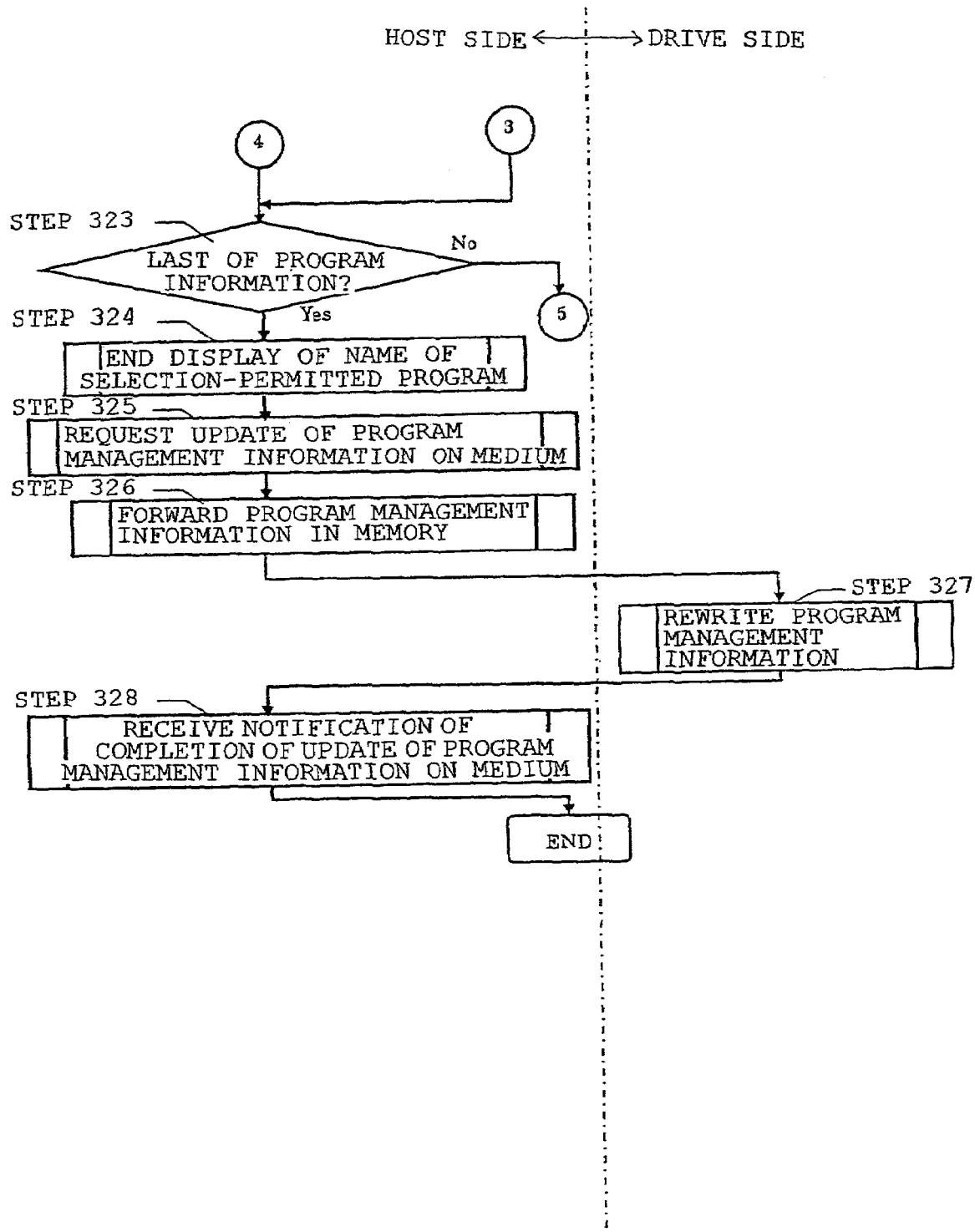
FIG. 8 is a detailed flow chart (4) for the selection means according to Embodiment 1.

Next, a processing step performed by the selection means 2 in the present embodiment is explained using FIG. 4.

When the selection means 2 in the hard disk unit 11 is read to the temporary storage memory (RAM) 1g as a program, and this program is executed by the central processing unit (CPU) 1a, the content of the program management information 5 in the storage medium 4 is obtained for each program (step 100). Next, the selection state 8 for each program is cross-referenced (101), and in the case where this is "permitted", the name 7 is displayed in the display device 1i (102). The processing of these steps 101-102 is executed for all the programs (103)

Next, the user selects a needed program by using the keyboard 1d, the mouse 1f or the like (104). The display state in the display device 1i at this time is shown in FIG. 9(a). The same diagram is explained in detail below.

Next, the program management information 5 is modified such that the selection state 8 of the programs which were not selected are set as selection-not-permitted (105). At this time, the central processing unit (CPU) 1a deletes the unselected programs from the program management information 5. Specifically, an OS file delete command may be used to delete a file designated by the path name 10, as "del a.exe".

On the other hand, for the selected program, a data file is created based on information in the data type 9 in the program management information 5 (106), and the file is started according to the path name 10 (107). For the data file created here, only the data type is set, and the data file does not have to have any content. That is, a file having a file name only and a data length of 0 byte is sufficient. Further, for a method for starting the program, for example, it is possible to use an API (Application Program Interface) called "ShellExecute" in Windows 98. Further, in the case where the program name of the program to be started is "a.exe" and the name of the data file to be created is "11990517.dat", it is possible to designate the data file name as an argument of an execution program, such as "a.exe 990517.dat", for the creation of the data and for the starting of the program, and have the execute program that is to be started execute generation of the data file.

The processing from steps 105 to 107 above is repeated with respect to all the selected programs (108), and the processing ends.

FIG. 5 to FIG. 8 further explain in detail the selection procedure performed by the selection means 2 explained in FIG. 4.

When the user attaches the storage medium 4 to the external storing unit 3 (step 300), once the processing by the selection means 2 begins, the central processing unit (CPU) 1*a* outputs a request to the external storing unit 3 to read the content of the program management information 5in the storage medium 4 (301). The external storing unit 3 obtains the position of the program management information on the medium, and reads the data (302).

Figure 9:
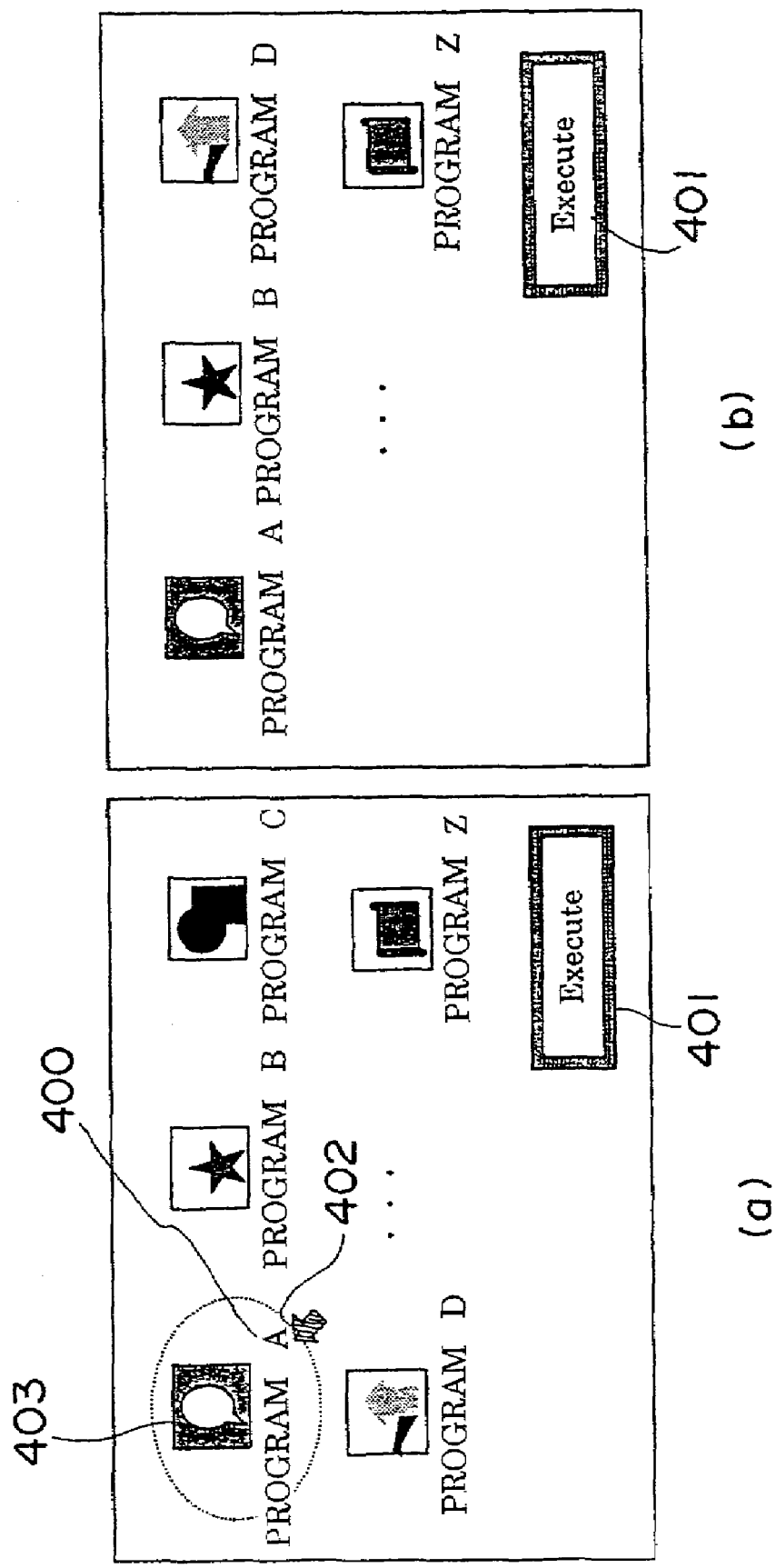
FIG. 9 are explanatory diagrams showing a display screen of a display device according to Embodiment 1.

Next, when the central processing unit (CPU) 1*a* receives a notification that the reading of the data is complete (303), the central processing unit 1*a* saves the received data to the temporary storage memory (RAM) 1*g*, and displays the names of all selection-permitted programs on the display device 1*i* (304). Display state at this time is shown in FIG. 9(*a*).

In response to this display, the user uses the keyboard 1*d* or the mouse 1*f* to select a desired program among the programs displayed on the display device 1*i* (305).

When the user selects the program, the central processing unit (CPU) 1*a* takes out all the selection-permitted programs among every program registered in the program management information 5, one at a time starting from the top, and checks whether or not they match the program selected by the user (306, 307).

Then, in the case where a program being examined is judged as not having been selected (307), the execution file path name 10 of this unselected program is obtained from the program management information 5 being stored in the temporary storage memory (RAM) 1*g* (308), and a delete request to delete the execution file is outputted to the external storage unit 3 (309).

The external storage unit 3 deletes the execution file in the storage medium 4 designated above from the program management information 5 (310), and clears the area of the storage medium 4 where the execution file existed (311).

When the deletion of the execution file is completed and the central processing unit (CPU) 1*a* recognizes the completion of the deletion (312), an entry for the program corresponding to the deleted execution file is deleted from the program management information 5 in the temporary storage memory (RAM) 1*g* (313).

On the other hand, at step 307, in a case where a program matches the selected program, the data type 9 of the target program is obtained from the program management information 5 in the temporary storage memory (RAM) 1*g* (314), and a data preparation request is outputted to the external storage unit 3 (315).

The external storage unit 3 writes the data file into the storage medium 4 (316). The information that is written at this time may be only a file name and an actual data therein may be length of 0 byte.

After the central processing unit (CPU) 1*a* receives a notification that the writing of the data file is completed (317), the central processing unit (CPU) 1*a* obtains the path name of the execution file for the target program from the program management information 5 in the temporary storage memory (RAM) 1*g* (318), and makes a request to the external storage unit 3 to read the execution file (319).

The external storage unit 3 obtains the location of the execution file on the medium from the storage medium 4 and reads this (320). When the central processing unit (CPU) 1*a* receives a notification that the reading of the execution file is completed (321), the central processing unit (CPU) 1*a* starts the execution file (322).

After the processing of the above steps 306 to 322 is executed with respect to all the programs included in the program management information 5 (323), the program selection display on the display device 1*i* is erased (324).

After that, the central processing unit (CPU) 1*a* makes a request to update the program management information 5 on the medium (325), and also forwards to the external storage unit 3 the content, which the selection state 8 has been update, of the program management information 5 in the temporary storage memory (RAM) 1*g* (326). After the external storage unit 3 receives this, the external storage unit 3 rewrites the program management information 5 which the unit 3 itself has (327), and returns this completion notification (an update completion notification) to the central processing unit (CPU) 1*a*, and the central processing unit (CPU) 1*a* having received the update completion notification ends the series of processing (328).

FIG. 9(*a*) shows a screen display on the display device 1*i* when the storage medium 4 is in its initial state. Displayed are the names 7 of all selection-permitted programs 400 held in the program management information 5 that was read out at step 302 above, and icons 403 symbolizing the programs 400. If the OS is an OS such as Windows98, it is possible to obtain the icons 403 from the execution files designated by the path names 10 in the program management information 5 by using an API called ExtractIcon. Further, it is also possible to prepare a separate image data file.

In the screen shown in FIG. 9(*a*), the user uses the keyboard 1*d* or a mouse cursor 402 of the mouse 1*f* to make the selection, and may position the mouse cursor 402 on an execution button 401 and click a mouse button (not shown), thereby determining the selection state (explained at step 305).

Further, in a case where a program C was not selected on the screen, the execution file for the program C is deleted as was explained in steps 308 to 313. At this time, when the selection screen is displayed again, the information regarding the program C is no longer displayed, as shown in FIG. 9(*b*).

Figure 10:
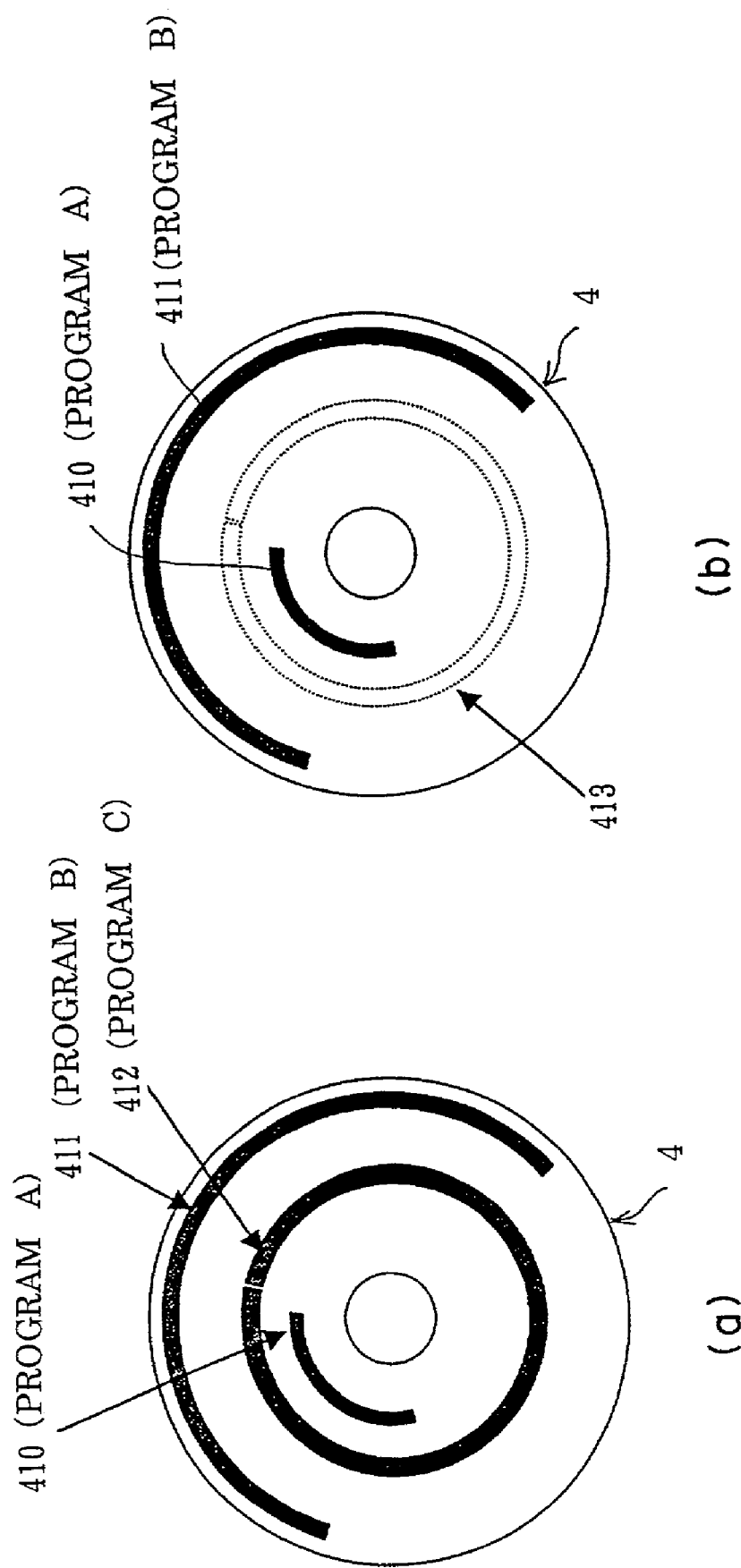
FIG. 10 are format-image diagrams on a storage medium according to Embodiment 1.

FIG. 10 shows a disk image in the storage medium 4.

In the case where a plurality of programs are registered in the program management information 5, a program A is registered in an area indicated by reference numeral 410 in FIG. 10(*a*), a program B is registered in an area indicated by reference numeral 411, and a program C is registered in an area indicated by reference numeral 412, respectively. Other area of the disk than these may store data as determined optionally by the user.

In the case where, for example, the program C was not selected by the user with the selection means 2, the data in the area of reference numeral 412 is initialized, and the area 413 after the deletion is secured as a data area for the user, as shown in FIG. 10(*b*).

Embodiment 2

In Embodiment 1, an example was explained in which unselected programs were deleted from the storage medium 4. The present embodiment is, however, an embodiment in which the programs are deleted according to its period of validity. A trial program is often provided with a validity period, and in the case where the validity period has expired according to date information of the computer system 1, the program does not start.

Note that the date information in Embodiment 2 (i.e., date and time information) may be obtained from a clock function built into the central processing unit (CPU) 1*a*.

Figure 11:
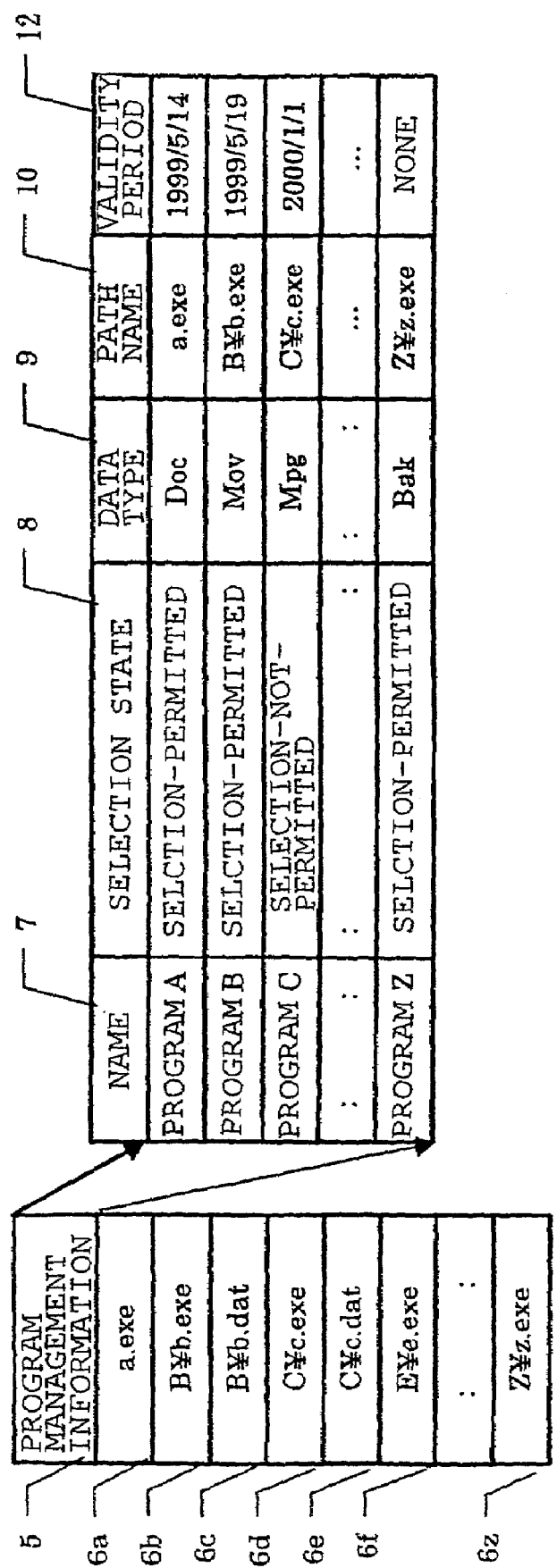
FIG. 11 is a configuration diagram of management information according to Embodiment 2.
Figure 12:
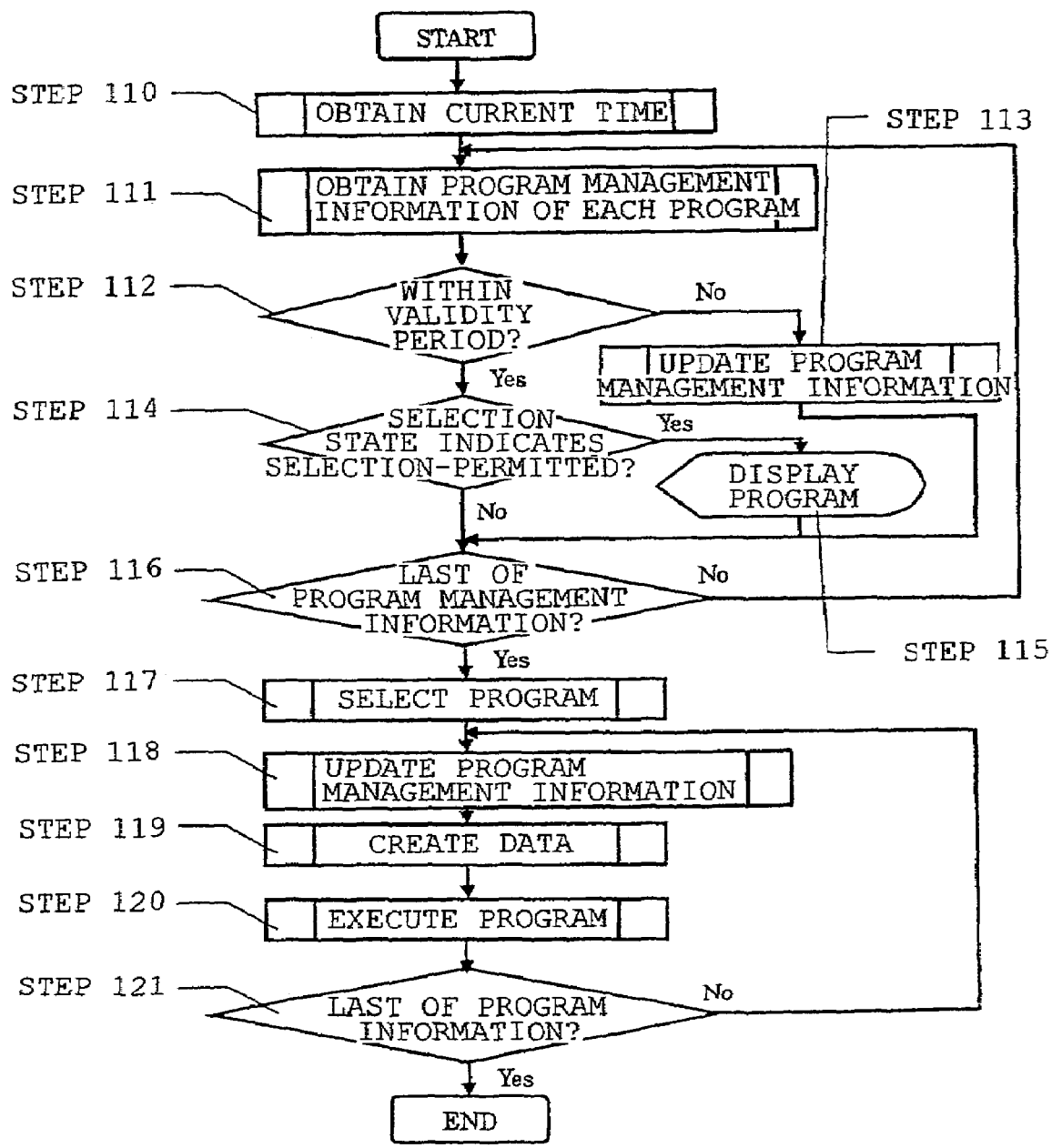
FIG. 12 is a processing flow chart for a selection means according to Embodiment 2.

FIG. 11 shows an example of a construction in which validity period information 12 regarding the program is added to the program management information 5 in order to make the program for which the validity period has expired not selected.

The validity period information 12 records a date when the program expires according to the Christian era or a notation of a date that is particular to the OS (110).

After the central processing unit (CPU) 1*a* loads the program selected by the selection means 2, the central processing unit (CPU) 1*a* reads the content of each program in the program management information 5 (111) and compares the date and time at that point with the validity period information 12 (112). Here, if the date and time at that point is within the validity period, the same processing is performed as in the steps including and subsequent to step 114, that is, the steps including and subsequent to the corresponding step 101 in FIG. 4. Then, in a case where the date and time at that point is determined to be out of the validity period at the determining step of step 112, the selection state 8 in the program management information 5 is set as "selection-not-permitted", and the information relating to the next program is read.

In the case where the selection state 8 in the program management information 5 is set as "selection-not-permitted", the unselected programs are deleted from the program management information 5. Specifically, in the case where the OS is Windows 98, a delete command such as "del a.exe" may be used to delete the execution files.

In accordance with Embodiment 2, the present invention may be used for distribution of programs, which limit the period during which they may be started, such as trial programs. Further, by setting the validity periods of the above programs to the same date and time, when the storage medium 4 that has exceeded this particular date and time is attached to the external storing unit 3 of the computer system 1, all the programs are deleted and the medium may be shown to the user in such a way that the user recognizes the medium as having no programs registered therein.

As described above, according to Embodiment 2, since the trial program having the limited validity period is managed on the user's computer system 1 (and programs which have completed their validity periods are deleted), on the distributing side it is not necessary to manage the media which have exceeded their validity periods. As a result, inventory management becomes extremely easy.

Further, for the validity period, it is also possible to set a time limit and a number of times of use instead of the date and time.

Embodiment 3

Embodiment 3 is an embodiment in which all the unselected programs are deleted and a usable area for the user is significantly expanded.

Figure 13:
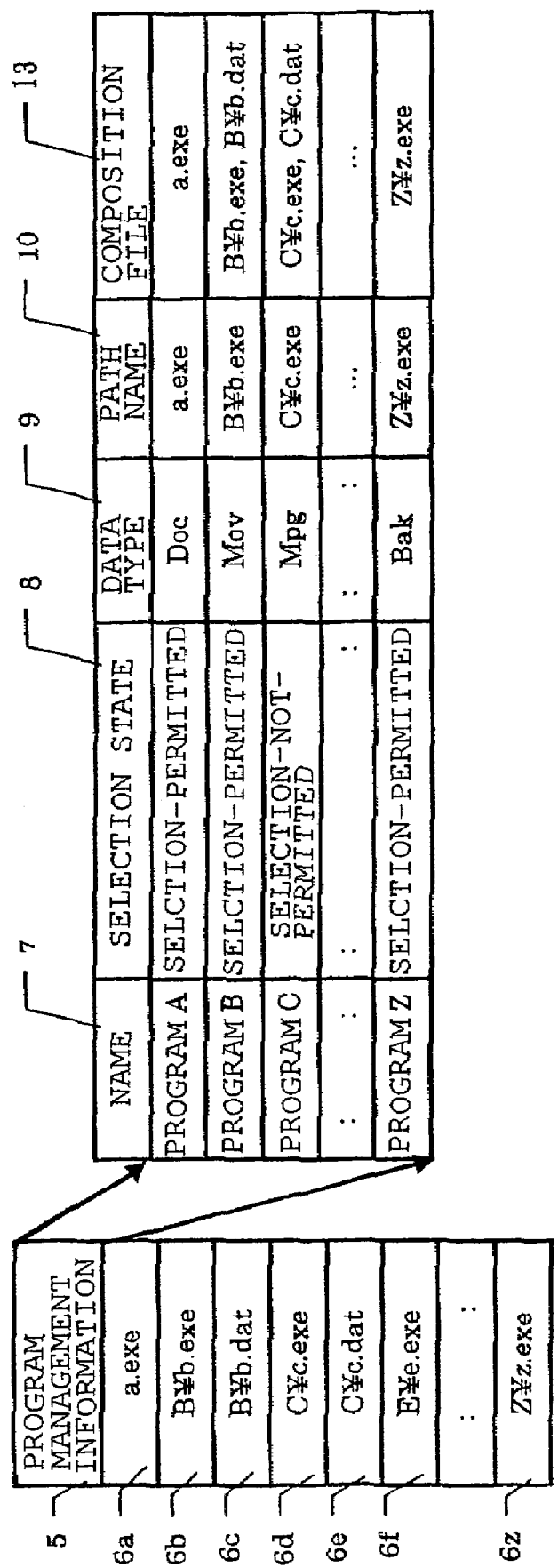
FIG. 13 is a configuration diagram of management information according to Embodiment 3.

FIG. 13 is an example of a case where composition file information 13 regarding the programs is added to the program management information 5 in order to achieve this.

This is configured such that in the composite files 13, the path name is written into all the files such as execution files, library files and information files which compose the programs.

Figure 14:
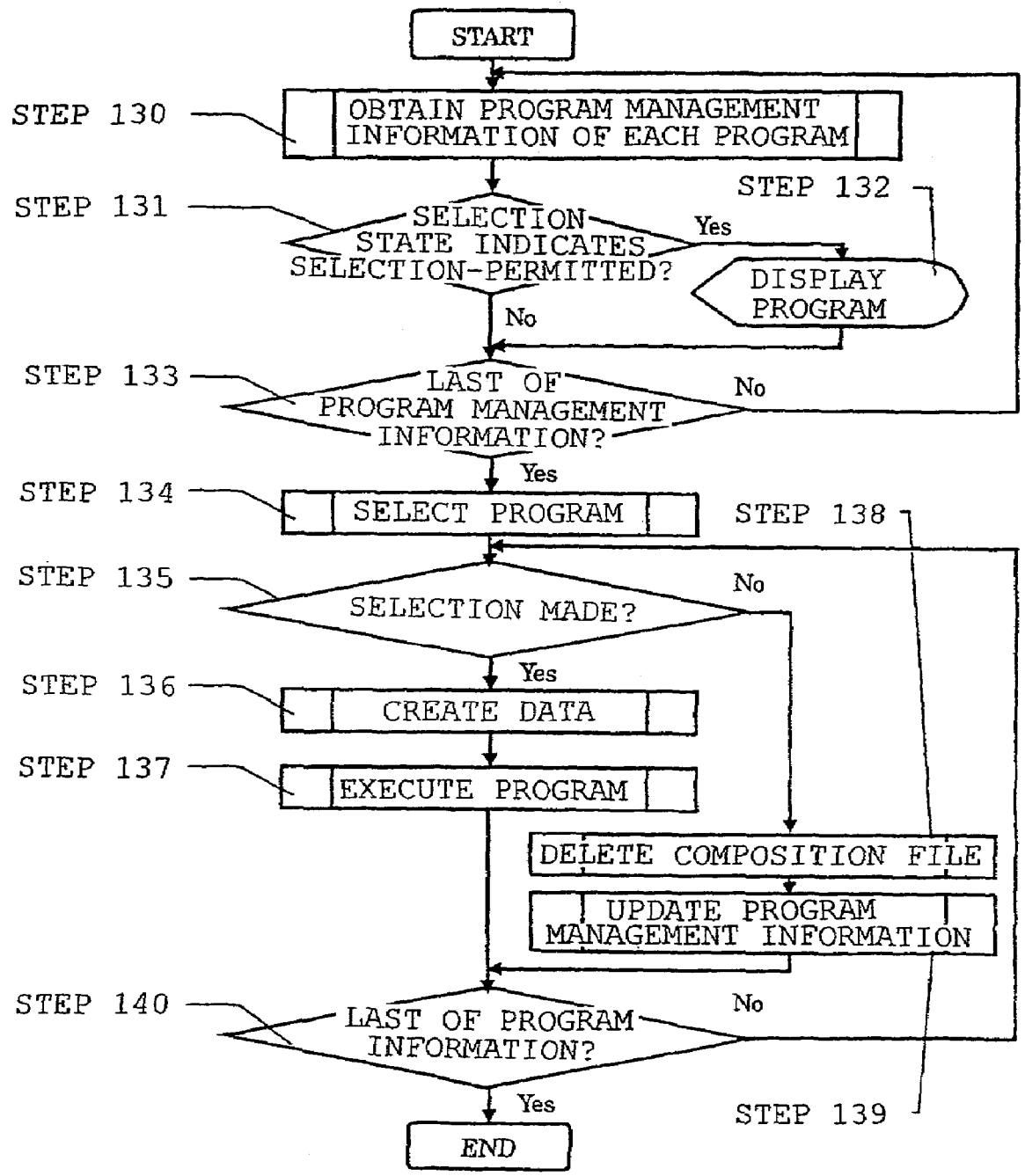
FIG. 14 is a processing flow chart for a selection means according to Embodiment 3.

Processing in Embodiment 3 is shown in FIG. 14. Since steps 130-134 in the same diagram are the same as steps 100-104 in FIG. 4, explanations thereof are omitted.

Determination is made as to whether each individual program was selected or not (135), and the files of the path names held in the composition file information 13 in the program management information 5 are all deleted (138).

Then, the entries in the program management information 5 relating to programs which were not selected are all deleted (139).

On the other hand, with respect to the selected program, creation of data (step 136) and execution of the program (step 136) are performed as in steps 106 to 107 in FIG. 4.

As described above, in accordance with Embodiment 3, all files composing the programs not selected by the user may be deleted; therefore, the capacity of the storage medium 4 may be utilized to the greatest extent in accordance with the user's selection state.

Embodiment 4

Embodiment 4 is an example relating to contents of processing of the programs. Embodiment 4 may be applied to the case of a complicated program which cannot be executed without carrying out environment configuration.

Embodiment 4 is realized by providing a configuration area on the hard disk unit 11.

Figure 15:
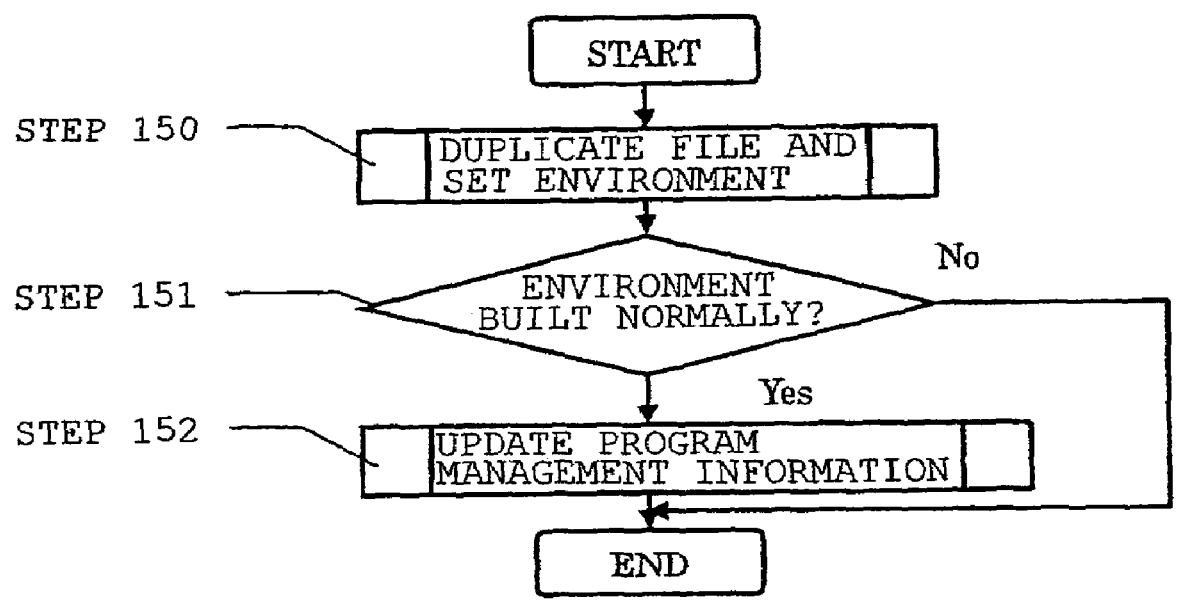
FIG. 15 is a processing flow chart according to Embodiment 4.

In the case where the program held in the storage medium 4 is a program for performing installation of software for creating data, processing such as shown in FIG. 15 is performed.

The program is held in the storage medium 4 as a compressed file, and this is expanded, returned to its initial state and duplicated onto the system designated by the user (onto the hard disk unit 11), and also, the environment is configured so that the program operates properly (150).

Here, in the case where the program is duplicated normally and the state in which the program can operate is achieved (151), the path name 10 in the program management information 5 is changed so that it becomes the name of the execution file on the system to which the program was duplicated (152) Specifically, a file "install.exe" is held at the path name 10, and this file "install.exe" copies a file "exec.exe" onto the system (onto the hard disk unit 11) and makes the file usable. Then, after the file "install.exe" is executed, the path name 10 is replaced with the file "exec.exe". Subsequently, the file "exec.exe" is started.

In accordance with Embodiment 4, even in the case of a program having a complicated construction which cannot be used without configuring the environment, the user data on the storage medium 4 may be linked and managed. Accordingly, a very usable environment for the user may be built.

Embodiment 5

Embodiment 5 is an effective embodiment in the case where an environment for creating and an environment for using are different, as in the case of a program for presentations or the like, in which a program capable of being edited is started on the computer system 1 used by the user, and a substitute program for display only (for example, a viewer) is started on another computer system at the time of the presentation.

Figure 16:
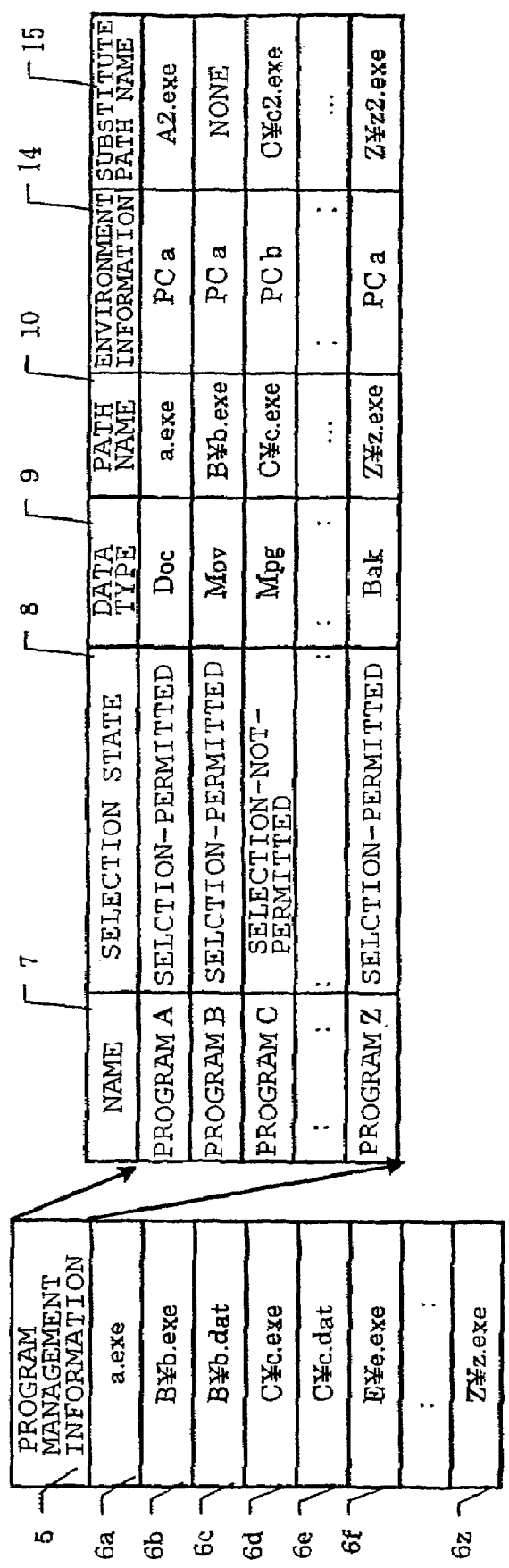
FIG. 16 is a configuration diagram for management information according to Embodiment 5.

FIG. 16 is an example of a construction in which environment information 14 and a substitute path name 15 are added to the program management information 5 in order to realize this.

In the above-mentioned environment information 14, there is written information for specifying the OS being used and the computer system that the user is using. Note that it is also possible to set the programs so that they operate in all environments at the time when the storage medium is distributed in its initial state.

In the substitute path name 15 there is written a path name of an execution file to be substituted in the case where the execution file designated by the path name 10 cannot be started.

Figure 17:
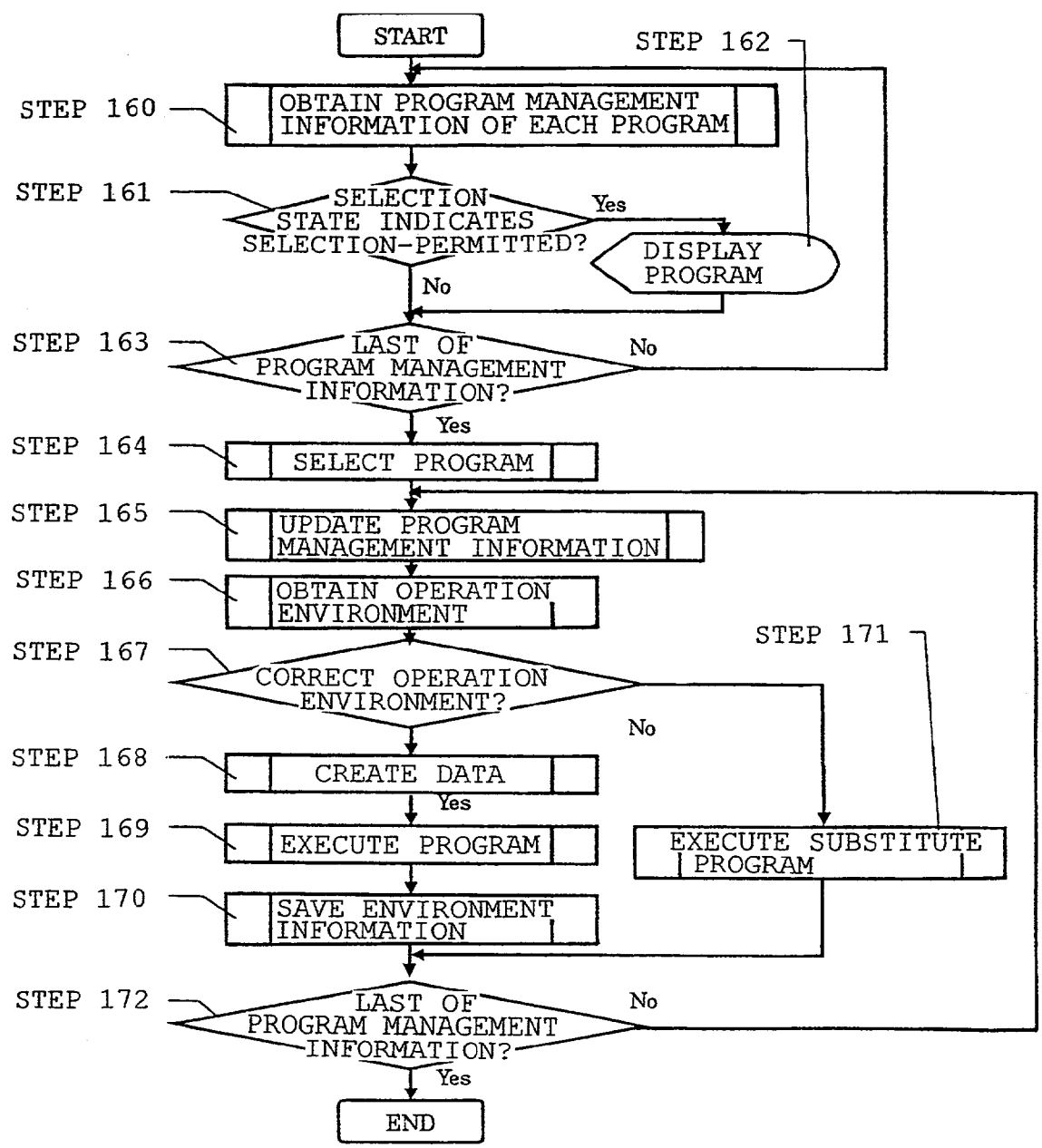
FIG. 17 is a processing flow chart for a selection means according to Embodiment 5.

FIG. 17 is a flow chart of processing in Embodiment 5.

Since the processing of steps 160 to 165 in the same diagram is similar to steps 100 to 105 in FIG. 4, explanations thereof are omitted.

After the program management information 5 is updated (165), information for specifying an operation environment is obtained (166). The information for specifying the operation environment refers to information of an address solely allocated to a network card in order to specify the computer system being used, for example.

After that, a determination is made as to whether or not the environment information 14 in the program management information 5 matches the operation environment that was obtained (167).

In the case where a match is detected at step 167 for the determination, the environment is judged to be an environment in which a standard execution program can operate, the data is created (168) and the program indicated by the path name 10 is started (169).

After that, the operation environment is set in the environment information 14 (170).

On the other hand, in the case where a mismatch is detected at the determination step 167, the execution program designated at the substitute path name 15 is started (171). However, it is not necessary that the program itself, which is to be executed as the substitute, exist.

Further, in Embodiment 5, explanation was made of a process for not creating a data file in the storage medium 4 in the case where the substitution mean is used. However, the data file may also be created.

According to Embodiment 5, in the case where an environment for creating and an environment for executing are different, as in the case of a program for presentations, in which a program capable of being edited is operated on the computer system used by a standard user and a program for only performing the presentation (a viewer) is started in case of performing the presentation, thereby being capable of separating the starting of the program. Accordingly, it is possible to build an environment where it is easy for the user to use the storage medium 4.

INDUSTRIAL APPLICABILITY

The present invention may be applied to management of trial programs in the case where a plurality of trial programs are registered on a rewritable storage medium such as a magnetic optical disk, a floppy disk, a phase change type optical disk, a DVD-RAM disk or the like to be sold.

The invention claimed is:

1. A program management method executed on a system for processing information on a storage medium having a rewritable area in which programs arc recorded, the method comprising the steps of:

obtaining management information on the programs recorded on the storage medium;

wherein the management information includes a path name, a substitute path name and environment information for specifying the system in use;

displaying types of the programs on a display device so that selection is permitted;

updating the management information of a program that is not selected as selection-not-permitted;

setting the program that was set as selection-not-permitted so that the program is set as selection-not-permitted, on the display device, based on the management information;

deleting the program set as selection-not-permitted in the management information;

obtaining information for specifying an operation environment of the system for processing the information on the storage medium;

determining whether or not the environment information matches the obtained information for specifying the operation environment of the system;

starting, when the environment information matches the obtained information for specifying the operation environment of the system, a program indicated by the path name; and starting, when the environment information does not match the obtained information for specifying the operation environment of the system, a program indicated by the substitute path name.

2. A program management method according to claim 1, wherein the management information is provided with a validity period of the program, and the method further comprises a step of comparing the validity period of the program with system clock information, in which, when the validity period of the program has expired, the management information is updated as selection-not-permitted and the program is deleted.

3. A program management method according to claim 1 or claim 2, wherein: the programs are composed of a plurality of files, and information on the files composing the program is registered in the management information; and in the step of deleting the program as selection-not-permitted, the information pertaining to the files is referenced and all the files composing the program are deleted.

4. A storage medium processing system for processing information on a removable storage medium having a rewritable area in which programs are recorded, the system comprising:

a processor:

a recognizing unit for recognizing information indicating selection-permitted/selection set with respect to each program on the storage medium;

a first obtaining unit for obtaining management information on the programs recorded on the removable storage medium,
wherein the management information includes a path name, a substitute path name and environment information for specifying the system in use;
a display unit for performing display in such a way that only a program set as selection-permitted is displayed in a manner in which selection is permitted;
a deleting unit for deleting programs set as selection-not-permitted
a second obtaining unit for obtaining information for specifying an operation environment of the system for processing the information on the storage medium;
a determining unit for determining whether or not the environment information matches the obtained information for specifying the operation environment of the system; and
a starting unit for starting, when the environment information matches the obtained information for specifying the operation environment of the system, a program indicated by the path name, and starting, when the environment information does not match the obtained information for specifying the operation environment of the system, a program indicated by the substitute path name.

* * * * *

UNITED STATES PATENT AND TRADEMARK OFFICE
CERTIFICATE OF CORRECTION

PATENT NO. : 7,376,946 B2  Page 1 of 1
APPLICATION NO. : 10/133723
DATED : May 20, 2008
INVENTOR(S) : Masahiro Nakada It is certified that error appears in the above-identified patent and that said Letters Patent is hereby corrected as shown below:

In the Claims:

Col. 10, line 12, claim 1 delete "arc" and insert --are--.

Signed and Sealed this

Fourteenth Day of October, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,376,946 B2 |
| APPLICATION NO. | : 10/133723 |
| DATED | : May 20, 2008 |
| INVENTOR(S) | : Masahiro Nakada |

Page 1 of 1

It is certified that error appears in the above-identified patent and that said Letters Patent is hereby corrected as shown below:

<u>In the Claims</u>:

Col. 10, line 66, delete "selection-permitted/selection" and insert

-- selection-permitted/selection-not-permitted --.

Signed and Sealed this

Tenth Day of February, 2009

JOHN DOLL
*Acting Director of the United States Patent and Trademark Office*